United States Patent [19]

Okamoto et al.

[11] Patent Number: 4,684,567

[45] Date of Patent: Aug. 4, 1987

[54] REINFORCED STRUCTURAL MATERIAL AND REINFORCED FIBROUS INORGANIC STRUCTURE REINFORCED THEREWITH

[75] Inventors: Tadashi Okamoto, Fujisawa; Sumiyuki Matsubara, Matsudo; Masahisa Handa, Tama, all of Japan

[73] Assignee: Mitsui Kensetsu Kabushiki Kaisha, Tokyo, Japan

[21] Appl. No.: 874,101

[22] Filed: Jun. 13, 1986

[30] Foreign Application Priority Data

Jun. 15, 1985 [JP] Japan ............ 60-129164
Jul. 2, 1985 [JP] Japan ............ 60-143898

[51] Int. Cl.4 ............ B32B 7/00
[52] U.S. Cl. ............ 428/257; 87/1; 428/365
[58] Field of Search ............ 428/36, 37, 257, 365; 87/1

[56] References Cited

U.S. PATENT DOCUMENTS

| | | | |
|---|---|---|---|
| 2,953,834 | 9/1960 | Muttart | 25/11 |
| 3,200,177 | 8/1965 | Dodd | 264/70 |
| 3,770,859 | 11/1973 | Bevan | 264/71 |
| 3,880,664 | 4/1975 | Schulze | 106/99 |
| 4,411,723 | 10/1983 | Takeuchi | 156/242 |
| 4,414,262 | 11/1983 | Hartmann et al. | 428/222 |
| 4,468,429 | 8/1984 | Takeda et al. | 428/283 |
| 4,504,428 | 3/1985 | Rotondo et al. | 264/34 |
| 4,536,438 | 8/1985 | Bishop et al. | 428/257 |

FOREIGN PATENT DOCUMENTS 2082112 3/1982 United Kingdom .

*Primary Examiner*—Marion C. McCamish
*Attorney, Agent, or Firm*—Birch, Stewart, Kolasch & Birch

[57] ABSTRACT

A reinforcing structural material is provided made of a plurality of fiber assembly cords interwoven into a braid, each of the cords being comprised of a plurality of fibers, and the braids being impregnated with a bonding agent for bonding together the fibers and cords. The reinforcing braid is useful for reinforcing a fibrous inorganic composite providing a product which is light in weight but excellent in strength characteristics.

20 Claims, 2 Drawing Figures

REINFORCED STRUCTURAL MATERIAL AND REINFORCED FIBROUS INORGANIC STRUCTURE REINFORCED THEREWITH

BACKGROUND AND FIELD OF THE INVENTION

The invention relates to a reinforcing structural material made of a plurality of fiber assembly cords, each cord comprising plural fibers, and the cords being formed into a braid characterized in that the braid is impregnated with a bonding agent. The invention further relates to a reinforced fibrous inorganic structure characterized by comprising a molded inorganic composite, short fibers mixed therein, and at least one reinforcing structural material embedded therein, the reinforcing structural material being in the form of a braid comprising a plurality of fiber assembly cords and impregnated with a bonding agent.

BACKGROUND OF THE INVENTION

This invention relates to a reinforcing structural material used in place of a reinforcing steel bar, a PC steel wire or the like for reinforcing the tensile strength of a structure or building by being embedded in a main structural material such as concrete, plastic or the like which is weak in tensile strength.

Reinforcing steel bars have previously been known as a reinforcing structural material, but these steel bars are inconvenient in that the bending work and bar arrangement work thereof are difficult, resulting in lowered workability thereof and in increase in weight of a structure.

For solving those difficulties, the applicant of this application in Japanese Patent Application No. Sho 58-224410 has proposed a reinforcing structural material braided with a plurality of fiber assembly cords, each comprising plural fibers. This proposed reinforcing structural material is not sufficiently strong because the plural fiber assembly cords are not bonded with each other and, in addition, the plurality of individual fibers constituting each fiber assembly cord are not bonded with each other. Thus a stress applied to each cord or fiber is not transmitted to the whole of the reinforcing structural material. Also the tensile strength of the reinforcing structural material is insufficient because a stress applied thereto is transmitted through the mutual friction between the cords or fibers.

A purpose of this invention, according to a first feature thereof, is to provide a reinforcing structural material free from the foregoing conventional problems and to provide a type of reinforcing structural material wherein a plurality of fiber assembly cords, each comprising plural fibers, are formed into a fibrous braid and the braid is characterized by impregnation with a bonding agent.

Another purpose of this invention, according to a second feature thereof, is to provide a reinforced fibrous inorganic structure excellent in toughness, tensile strength, light in weight and characterized by comprising a molded inorganic composite, short fibers mixed therein and at least one reinforcing structural material embedded therein, the reinforcing material being in the form of a braid comprising a plurality of fiber assembly cords and impregnated with a bonding agent.

DETAILED DESCRIPTION OF THE INVENTION

Figure 1:
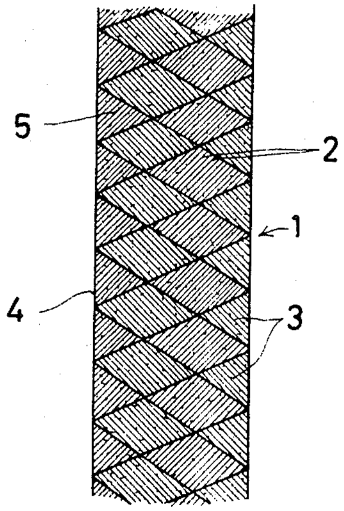
FIG. 1 is an enlarged front view of part of one exemplified reinforcing structural material of this invention.

With reference to FIG. 1, the reinforcing structural material 1 is constructed such that, for example, eight fiber assembly cords 3, each comprising a plurality of fibers 2 made of aromatic polyamide fibers, are interwoven into a braid 4. According to this invention, the braid 4 is impregnated with a bonding agent 5 so that the bonding agent 5 may bond not only the cords 3 together, but may also bond together the fibers 2 of each cord 3.

The aromatic polyamide fibers constituting the fibers 2 may contain fibers of straight coordinated aromatic polyamide, aromatic polyether amide, aromatic polysulphide amide, aromatic polysulphone amide, aromatic polymethylene amide, aromatic polyketone amide, aromatic polyamine amide and copolymers thereof, etc. Further, the fibers 2 are not limited in kind to the foregoing aromatic polyamides, and instead thereof the fibers may comprise carbon fibers, glass fibers, ceramic fibers or other desired inorganic fibers; polyester fibers, strong aliphatic polyamide fibers, high strength polyolefin fibers, strong polyvinylalcohol fibers or any other desired organic fibers; or cold drawn steel wire, steel wire for prestress or any other desired metallic fibers; in a single or combined use selected from the above desired kinds of fibers.

Figure 2:
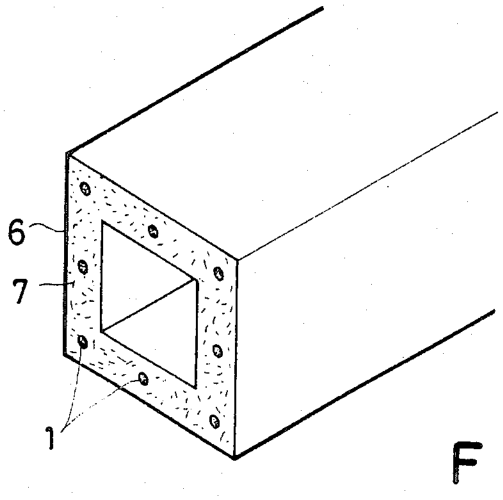
FIG. 2 is a perspective view of part of one exemplified reinforced fibrous inorganic structure of this invention.

The fiber 2 can take a variety of cross-sectional shapes along the longitudinal length thereof. But if the fiber 2 is formed so as to have different cross sectional shapes along its longitudinal length, then this configuration will increase the frictional force between the individual fibers and, as a result, stress applied to each fiber can more easily be transmitted to the entire reinforcing material 1. In this situation in a product where the reinforcing material 1 is embedded in an inorganic composite 6 as shown in FIG. 2, a close contact between the reinforcing structural material 1 and the inorganic composite 6 can be improved, resulting in an improved structural product.

The diameter of the fiber 2 to be used is generally in the range of from several microns to several tens of microns.

As for the shape of the braid to be formed by the fiber assembly cords 3, besides the round braid as mentioned above, the cords 3 may be interwoven into a flat braid, a square braid or any other desired shape. The braid 3 may also be formed into a braid which is different in its sectional shape along the longitudinal direction thereof to improve the close contact between the same and the inorganic composite 6.

The bonding agent 5 may be comprised of, for example, a cold setting or thermosetting resin such as of the epoxy type, polyester type, vinylester type, phenolic type, polyimide type, etc.; a cold setting or thermosetting inorganic bonding agent such as of the alkali metal silicate type, colloidal silica type, or phosphate type; or a mixture of a cold setting or thermosetting organic resin and an inorganic bonding agent. An impregnation ratio of the bonding agent to the braid may be 10–50 parts by weight, preferably 30–40 parts by weight of the former to 100 parts by weight of the later.

The fibers 2 of the braid 4 are bonded one with another with the bonding agent 5 by following a process such as a process wherein after the fiber assembly cords 3 are braided, the braid is immersed in an uncured bonding agent in a liquid form so that the fibers 2 of each of the fiber assembly cords 3 may be impregnated with the liquid bonding agent and thereafter, the braid is subjected to a curing treatment or a process such that each fiber assembly cord 3 is impregnated with the liquid bonding agent 5 and, subsequently, a plurality of fiber assembly cords are braided together to form the braid. The bonding agent 5 is then subjected to a curing treatment.

The reinforcing structural material 1 may be produced in the form of a straight material or in the form of any desired curve shape. In addition, the reinforcing structural material 1 may be produced not only at a factory, but also at the site of construction of a building, for instance. In situations where the reinforcing structural material 1 is used as a reinforcing member, such as a shearing reinforcing bar which is usually required to be bent, for instance, or a coiling round main reinforcing bar in the case of a bar arrangement work, it is preferable that the reinforcing structural material 1 is coiled around the main reinforcing bars while the bonding agent 5 impregnated therein is not yet completely cured, whereby the bar arrangement work can be performed firmly and reliably.

The integrity of the inorganic composite 6 can be improved by coating a film, such as hydrophilic material of a wettable and underwater settable type epoxy resin or the like, on the peripheral surface of the reinforcing structural material 1.

The reinforcing structural material 1 of the braid-type may also be used as is or in a net or fabric form obtained by interweaving a plurality of braids.

FIG. 2 shows one exemplified reinforced fibrous inorganic structure of this invention comprising a molded inorganic composite 6 formed into a hollow square tubular body, short fibers 7 uniformly mixed therein and the eight reinforcing structure materials 1 in the form of a round braid embedded therein at regular intervals therebetween in the peripheral direction thereof and in parallel along the longitudinal direction thereof.

The inorganic composite 6 comprises, in general, cement, sand and water. Instead of cement, however, plaster may be used, as the main component of said composite. As for cement, any kind of cement may be used selected from Portland cement, aluminous cement, Portland blast-furnace cement, silica cement, flyash cement, etc. In the inorganic composite 6 there may be selectively added milling aids, retarders, accelerators, water reducing agents, coagulants, thickeners, builders such as an air entraining agents, etc., and suitable-sized aggregates.

Short fibers 7 are mixed into the composite for improving toughness of the reinforced fibrous inorganic structure. Short fibers 7 may be comprised of one or more of the various fibers as enumerated above for the fibers 2. In general the short fibers 7 should range in size from several microns to several tens microns in diameter and from 5 to 15 mm in length. Those fibers are preferably mixed in the inorganic composite in an amount of up to 2% by volume relative to the inorganic composite. As for the content ratio of the reinforcing structural material 1, 5% by volume thereof at the maximum is, in general, contained therein.

One example of manufacturing a reinforced fibrous inorganic structure according to the invention is explained as follows:

36 fiber assembly cords ("Kevlar 49") each cord being made of total aromatic polyamide and having a diameter of 1420 denier were interwoven into a round braid of 3 mm in diameter. The braid was impregnated with a bonding agent composed of 100 parts by weight of bisphenol A/epicholorohydrin type epoxy resin ("DER 332 Dow Chemical") and 14 parts by weight of triethylenetetramine in an impregnation ratio of 40 parts by weight thereof to 100 parts by weight of the foregoing braid. Thereafter, the braid impregnated with the bonding agent was heated for 3 hours at 100° C. under such a condition that the shape of the braid was retained by coiling a tape thereround, so that the bonding agent was cured completely. After curing, the tape was uncoiled. Thus there was produced a reinforcing structural material of a braid type.

Next, eight reinforcing structural materials produced as mentioned above were embedded in an inorganic composite composed of a mixture of 911 kg/m$^3$ of Portland cement, 310 kg/m$^3$ of water, 1,002 kg/m$^3$ of sand and 13.67 kg/m$^3$ of thickener and mixed with 1.5 % by volume of short fibers ("Kevlar 49") each being 15 mm in length, in such an arrangement that two lines of four reinforcing structural materials were disposed above and below in the inorganic composite. Thereafter, the inorganic composite including the short fibers and such disposed reinforcing structural materials was extruded under a vacuum of 75 mm Hg under an extrusion pressure of 10 kg/cm$^2$, and at an extruding speed of 1.5 m/min., so that there was formed an extruded mold body, i.e., a reinforced fibrous inorganic structure having a rectangular sectional shape of 50 mm by 100 mm. Thereafter, the reinforced fibrous inorganic structure was cured for 14 days at 20° C., so that there was produced a molded reinforced fibrous inorganic structure. The bending strength thereof was 205 kg/cm$^2$.

For comparison, there was produced a reinforced fibrous inorganic structure by the same process as the foregoing manufacturing process of this invention product, except that no bonding agent was impregnated with the reinforcing structure material of the braid type. As a result thereof, the bending strength of the product was 110 kg/cm$^2$.

Thus, according to a first feature of this invention, the reinforcing structure material of a braid type is impregnated with a bonding agent, so that the respective mutual bondings between the fiber assembly cord can be performed. Accordingly a stress applied to each of the fibers can be transmitted to the whole of the reinforcing structural material reliably without fail, and a tensile strength of the reinforcing structural material is excellent.

According to a second feature of this invention, the reinforced fibrous inorganic structure comprises a molded inorganic composite, short fibers mixed therein and at least one foregoing reinforcing structural material of this invention embedded therein, so that the product is excellent in toughness and is light in weight.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A reinforcing braid comprising a plurality of fiber assembly cords interwoven to form a braid, each of said cords comprising a plurality of fibers, and said braid being impregnated with a bonding agent for bonding together said plurality of fibers and for bonding together said plurality of cords.

2. A reinforcing braid as in claim 1, wherein said fibers are aromatic polyamide fibers.

3. A reinforcing braid as in claim 2, wherein said fibers are a member selected from the group consisting of straight coordinated aromatic polyamides, aromatic polyether amides, aromatic polysulphide amides, aromatic polysulphone amides, aromatic polymethylene amides, aromatic polyketone amides, aromatic polyamine amides, and copolymers thereof.

4. A reinforcing braid as in claim 1, wherein said fibers are organic fibers, inorganic fibers or metallic fibers.

5. A reinforcing braid as in claim 4, wherein said fibers are a member selected from the group consisting of carbon fibers, glass fibers, ceramic fibers, polyester fibers, strong aliphatic polyamide fibers, polyolefin fibers, polyvinylalcohol fibers and steel fibers.

6. A reinforcing braid as in claim 1, wherein said bonding agent is a cold setting resin or a thermosetting resin, or a cold setting or themosetting inorganic bonding agent.

7. A reinforcing braid as in claim 6, wherein said bonding agent is a member selected from the group consisting of an epoxy resin, a polyester resin, a vinylester resin, a phendic resin, a polyimide resin, an alkali metal silicate bonding agent, a colloidal silica bonding agent and a phosphate bonding agent.

8. A reinforced fibrous inorganic composite comprising a settable composite material having embedded therein at least one reinforcing braid comprising a plurality of fiber assembly cords comprising a plurality of fibers, and said braid being impregnated by a bonding agent for bonding together said plurality of fibers and for bonding together said plurality of cords.

9. A composite as in claim 8, wherein settable composite material is plaster or a cementious material selected from the group consisting of Portland cement, aluminous cement, Portland blast-furnace cement, silicon cement and flyash cement.

10. A composite as in claim 9, wherein said cementious material includes up to 2% by volume of short fibers relative to the inorganic composite.

11. A composite as in claim 10, wherein said short fibers have a length of form 5 to 15 mm.

12. A composite as in claim 11, wherein said short fibers of said cords are aromatic polyamide fibers.

13. A composite as in claim 12, wherein said fibers are a member selected from the group consisting of straight coordinated aromatic polyamides, aromatic polyether amides, aromatic polysulphide amides, aromatic polysulphone amides, aromatic polymethylene amides, aromatic polyketone amides, aromatic polyamine amides, and copolymers thereof.

14. A composite as in claim 8, wherein said fibers are organic fibers, inorganic fibers or metallic fibers.

15. A composite as in claim 14, wherein said fibers are a member selected from the group consisting of carbon fibers, glass fibers, ceramic fibers, polyester fibers, strong aliphatic polyamide fibers, polyelefin fibers, polyvinylalcohol fibers and steel fibers.

16. A composite as in claim 8, wherein said bonding agent is a cold setting resin or a thermosetting resin, or a cold setting or themosetting inorganic bonding agent.

17. A composite as in claim 16, wherein said bonding agent is a member selected from the group consisting of an epoxy resin, a polyester resin, a vinylester resin, a phendic resin, a polyimide resin, an alkali metal silicate bonding agent, a colloidal silica bonding agent and a phosphate bonding agent.

18. A composite as in claim 8, wherein said composite contains up to 5% by volume of said reinforcing braid.

19. A composite as in claim 8, wherein the peripheral surface of said reinforcing braid includes a coating of a hydrophilic material.

20. A composite as in claim 19, wherein said hydrophilic material is a wettable and underwater settable type epoxy resin.

* * * * *